United States Patent [19]
Guthrie et al.

[11] Patent Number: 5,512,902
[45] Date of Patent: Apr. 30, 1996

[54] STOCK LOCATOR SYSTEM USING GPS TRANSLATOR

[75] Inventors: Warren E. Guthrie, Glen Ellyn; John A. Haag, Aurora; Roger B. Williams, Lake Zurich, all of Ill.

[73] Assignee: Northrop Grumman Corporation, Los Angeles, Calif.

[21] Appl. No.: 229,244

[22] Filed: Apr. 18, 1994

[51] Int. Cl.⁶ .............................. H04B 7/185; G01S 5/02
[52] U.S. Cl. ......................................................... 342/357
[58] Field of Search ............................................. 342/357

[56] References Cited

U.S. PATENT DOCUMENTS

| | | | |
|---|---|---|---|
| 4,359,733 | 11/1982 | O'Neill | 343/6.5 |
| 4,740,792 | 4/1988 | Sagey et al. | 342/457 |
| 4,819,053 | 4/1989 | Halavais | 342/353 |
| 4,839,656 | 6/1989 | O'Neill et al. | 342/357 |
| 4,924,699 | 5/1990 | Kurodo et al. | 73/178 R |
| 4,961,073 | 10/1990 | Drapac et al. | 340/824.44 |
| 4,995,099 | 2/1991 | Davis | 455/343 |
| 5,003,619 | 3/1991 | Morris et al. | 455/69 |
| 5,025,251 | 6/1991 | Mittel et al. | 340/825.44 |
| 5,027,428 | 6/1991 | Ishiguro et al. | 455/67 |
| 5,033,109 | 7/1991 | Kawano et al. | 455/90 |
| 5,111,209 | 5/1992 | Toriyama | 342/357 |
| 5,119,102 | 6/1992 | Barnard | 342/357 |
| 5,148,179 | 9/1992 | Allison | 342/357 |
| 5,155,490 | 10/1992 | Spadley, Jr. et al. | 342/357 |
| 5,160,935 | 11/1992 | Inamiya | 342/357 |
| 5,185,610 | 2/1993 | Ward et al. | 342/357 |
| 5,210,540 | 5/1993 | Masumoto | 342/357 |
| 5,379,224 | 1/1995 | Brown et al. | 364/449 |
| 5,392,052 | 2/1995 | Eberwine | 342/357 |

*Primary Examiner*—Theodore M. Blum
*Attorney, Agent, or Firm*—Terry J. Anderson; Karl J. Hoch, Jr.

[57] ABSTRACT

A device which is useful in locating lost articles including a GPS translator, located in close proximity of said lost article. The GPS translator is capable of translating a frequency transmitted from a GPS transmitter to a GPS receiver, the GPS receiver is capable of receiving a first signal directly from the GPS transmitter, and a second signal transmitted from the GPS transmitter, through said GPS translator, to the GPS receiver. Since the translator typically uses considerable energy during continual usage, there is a power management portion included which actuates the translator only during those times that a coded signal is transmitted to the translator, which is typically transmitted by the user who is attempting to located the lost article.

20 Claims, 4 Drawing Sheets

STOCK LOCATOR SYSTEM USING GPS TRANSLATOR

FIELD OF THE INVENTION

The present invention relates to locator systems, and more particularly to a system to be used to locate articles within a group of similar articles (such as specific tractor trailers in a truck yard or specific rail cars in a stockyard) using a GPS transmitter-receiver system.

BACKGROUND OF THE INVENTION

In recent years, the control of shipped goods from one location to another has become more sophisticated and complex with increases in the number of consumers, and the distances between the consumers and most manufacturers. In addition, there has been an associated increase in the speed in which many goods need to be delivered. Also, the concept of "just in time" manufacturing and supply concepts have been developed which have necessitated the rapid supply of goods.

One major problem with the above shipping situation is that occasionally goods, or even loads of goods, become lost. Considering the amount of cargo traffic which traverses rail yards, cargo ships, truck depots, etc., one realizes the magnitude of the challenge to maintain effective shipping techniques without the associated losses. Even though most lost goods are eventually found, the searching process itself is inefficient and can severely impact manufacturing and supply schedules. Additionally, the searching process may take place under less than desirable or even hazardous conditions (in the winter, in the desert, etc.).

The present invention provides for a system by which the lost item (tractor trailers, rail cars, shipping containers, etc.) can be easily and quickly located. This system uses the known global positioning system (hereafter GPS) to assist in finding the lost object. The use of GPS to define the position of objects, by itself, is not new and has been used in the navigational positioning of airplanes, ships, etc. However, such GPS systems have used a relatively large amount of energy. Alternately, the use of individual GPS receivers located on each shipped item would make a system for locating a lost item from many similar items prohibitively expensive. Therefore, the present invention provides a technique by which a single GPS receiver can be used adjacent to a single stock area (or any location where there are likely to be lost articles) to reliably locate those lost articles. This is accomplished by positioning a translator in close proximity to the lost article, which alters the frequency of the GPS signal. The altered GPS signal and the GPS original signal are received by an interrogation unit, which compares the original and the translated signal to determine the relative position of the translator.

Prior systems for locating lost articles, where each article continually transmits a continuous GPS signal, not only produce a lot of needless congestion over the transmission networks, but also require each lost article to have a significant energy source. When the transmission to a distant satellite is required, as is the case in GPS systems, a large amount of energy is expended by the transmitters. Such a system would require either large generators or expensive batteries necessitating large expenses, frequent replacements, or recharging. Since none of the above options are attractive or practical, it is desirable to produce a power management portion which limits the energy expended by such transmissions, which forms one of the major aspects of the present invention.

SUMMARY

The present invention relates to a device useful in locating lost articles which includes a GPS translator that is located in close proximity to each lost article. The GPS translator is capable of translating a frequency transmitted from a GPS transmitter to a different frequency.

DETAILED DESCRIPTION OF THE INVENTION

Figure 1:
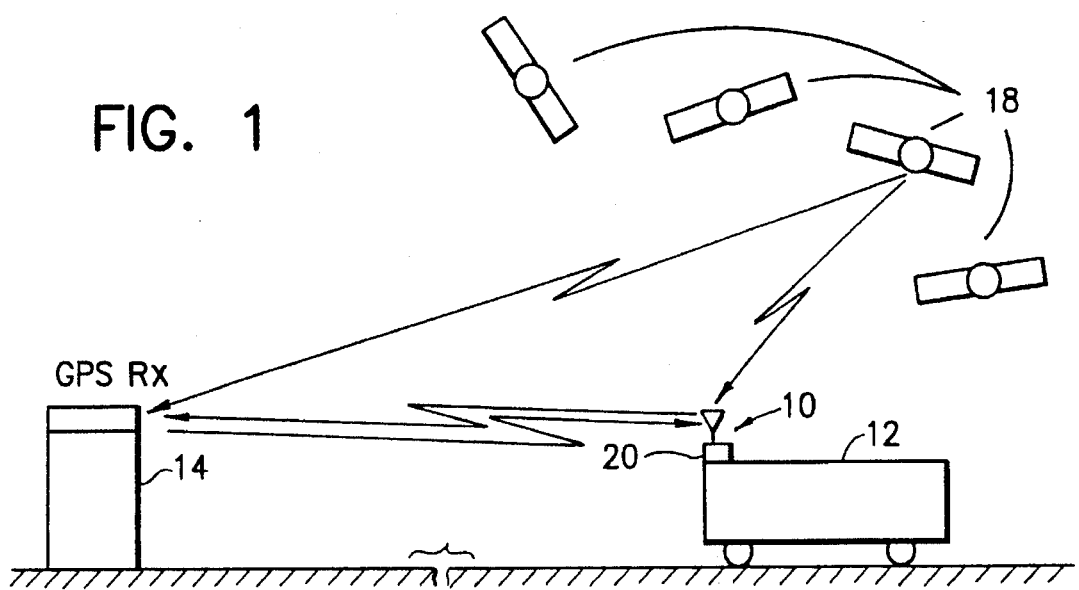
FIG. 1 illustrates a perspective view illustrating one embodiment of the basic elements of the present invention including an interrogation unit (14), a remote module (10), and a plurality of GPS satellites (18), the communication links to only one of the GPS satellites (18) are illustrated to simplify the illustration.

In the disclosure, elements which perform identical functions in the different embodiments will be provided with similar reference characters.

The present invention is intended to facilitate in the locating of lost items. The primary application of the present invention is to locate one item within a large number of comparable items (a truck in a truck yard, a shipping container in a shipping region, or one or a set of rail cars in a railway yard, etc.). The general operation of the invention is as follows:

1. The interrogation unit is positioned in the general area where the lost article is potentially located. The interrogation unit may be mobile, hand held, affixed to a vehicle, located in a tower, or positioned in any desired location based on the specific application.
2. A code which represents a serial number corresponding to the lost article is entered into the interrogation unit.
3. The interrogation unit transmits the code by radio frequency (or some other low power electromagnetic radiation).
4. A remote module, affixed to the lost article, receives and decodes the code.
5. The remote module determines if the received code corresponds to the articles serial number. If the answer is "yes", then the remote unit becomes active.
6. Upon activation, the remote module receives the global positioning system (hereafter referred to as GPS) frequency band, amplifies it, and shifts the frequency to an alternate band. This shifting of frequency band is known as translation. The signal at the alternate frequency band is amplified to a higher power (corresponding to range power requirements) and is then retransmitted back to the interrogation unit. The translated frequency transmission lasts for several minutes, or any period sufficient to locate the lost article considering the specific application.

7. Concurrent to steps 3 to 6, the interrogation unit receives the translated GPS transmission from the remote unit, and computes the position of the remote unit compared to the interrogation unit using standard GPS receiver techniques, typically by comparing the position which the transmission originates from a known position of a receiver.

8. The user (person) may now travel to the location indicated by the interrogation unit to retrieve the lost article.

FIG. 1 illustrates the basic elements of the present invention, in which the primary components are a remote module 10 located in proximity to a lost article 12 (typically affixed thereto), an interrogation unit 14, and a plurality of GPS satellites 18. Each remote module 10 contains a translator 20 (which replaces a prior art GPS receiver to be located on each potentially lost article). The translator, as applied to the locating of, and inventory of, stock relative to a person seeking the stock, partially forms the present invention. Even though only one lost article 12 is illustrated in FIG. 1, it is envisioned that for the system to function effectively, that there will be a large number of similarly appearing lost articles (such as truck trailers, railcars, cargo containers, etc.) within a small area which will present a large likelihood of confusion. Each lost article 12 is equipped with its own distinct remote module 10.

This paragraph describes how the present invention GPS satellite-receiver configuration operates. There are approximately 20 geo-stationary GPS satellites which presently orbit the earth. The distances from a GPS satellite to a GPS receiver 62, and translator 20, are determined by timing signals travelling from a plurality of GPS transmitters (not illustrated) located on the GPS satellites to the receiver 62 (or translator 20). The translator translates the frequency of the signal it receives into a frequency band which can be picked up by the interrogation unit. Thus the interrogation unit 14 potentially receives two GPS signals from each satellite (GPS transmitter). The first signal is a direct signal from the GPS satellite. The second signal is the (frequency) translated signal which has travelled from the GPS satellite to the remote module 10, and then had the frequency altered and retransmitted to the interrogation unit 14. The communication links are illustrated between only one GPS satellite 18 and the remote module 10, and the interrogation unit 14 for ease of illustration.

Precise distance information from any GPS satellite can be obtained by the receiver 62 (either direct or via translator 20). The accurate position in space of the GPS receiver 62 (or translator 20) can be precisely determined by triangulation using multiple GPS satellites in a manner well known in the art. The triangulation requires that the receiver 62 and the translator 20 both be in communication with at least 4 common GPS satellites at one given time. Relative GPS techniques as described below can be used to determine the relative position of the translator (which is contained within the remote module) relative to the receiver (which is contained within the interrogation unit) for the reasons, and using the techniques, as set out below.

Positioning a remote module on each article is only desirable when more than a few articles which can become confused are involved. When there are many articles which must be interfitted with GPS receivers, the cost may become prohibitive. A large number of receivers continually transmitting positional information would also congest the airwaves. Additionally, some technique is necessary to control the number of transmissions of positional information from each remote module to conserve the energy consumed by the power sources. This low power is desirable to ensure that the system has low maintenance, and low replacement or recharge requirements for expensive batteries or generators.

Figure 2:
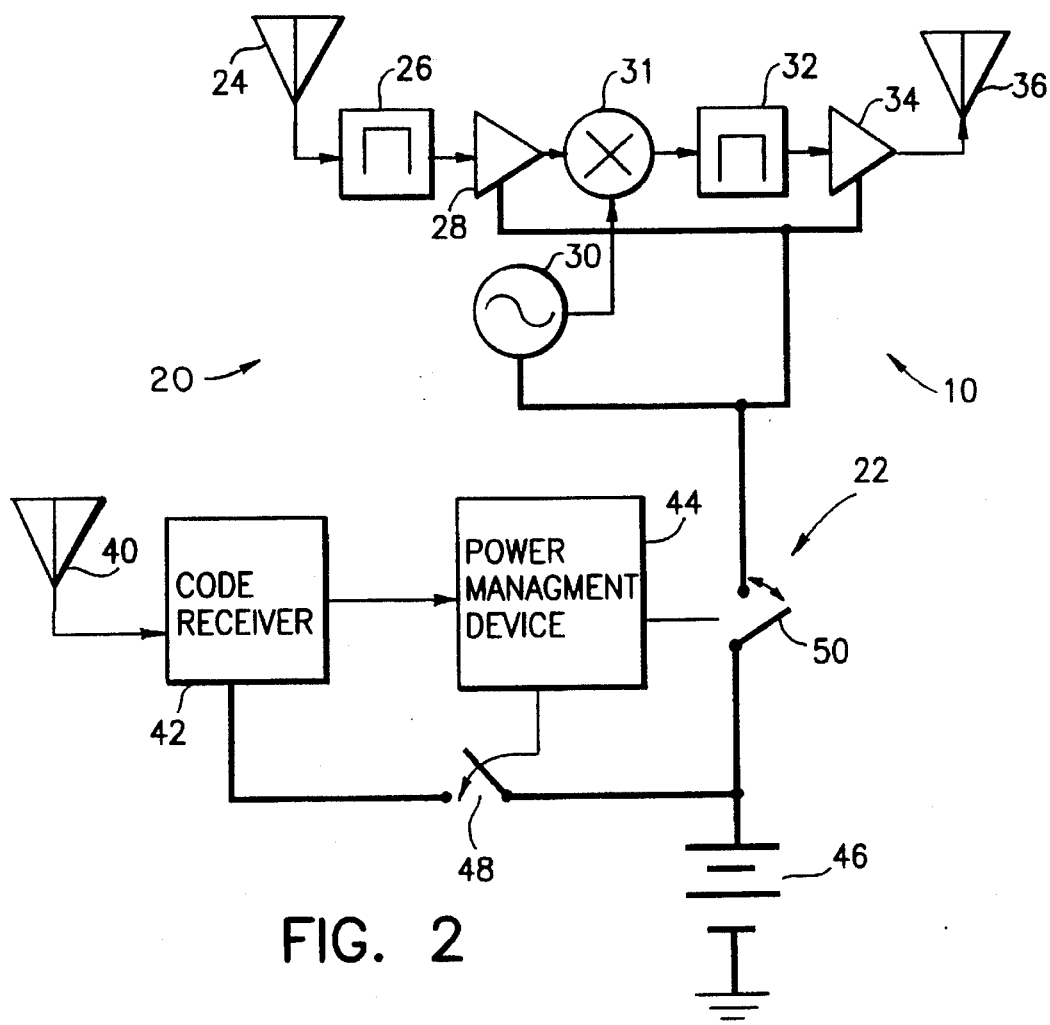
FIG. 2 illustrates a schematic view of one embodiment of a remote module (10) of the present invention, which is typically located in close proximity to a potentially lost article.

FIG. 2 illustrates a schematic diagram of one embodiment of the remote module 10 of FIG. 1 of the present invention. The remote module 10 includes a GPS interface portion 20 and a power management portion 22. The GPS interface portion 20 includes a GPS receive antenna 24, a GPS filter 26, a low noise amplifier 28, a local oscillator 30, a mixer 31, a transmission band filter 32, an output amplifier 34, and a GPS retransmit antenna 36. The power management portion 22 includes a code receive antenna 40, a code receiver 42, a power management device 44, a power supply device 46, a power management portion switch 48, and a GPS interface portion switch 50.

The GPS interface portion 20 receives a GPS input signal transmitted by a GPS transmitter (located on the GPS satellites 18) using the GPS receive antenna 24, and retransmits a translated signal, the frequency of which is shifted by a certain frequency, but otherwise contains an identical bandwidth, etc. over the GPS retransmit antenna 36 in the following manner. The GPS input signal typically oscillates at a frequency of 1575.42 MHz. In this disclosure, the use of specific frequencies and elements are intended to be illustrative (and not limiting) in scope. The GPS input signal which has been received by the GPS receive antenna 24, is applied to the GPS filter 26. The GPS filter 26 selects a GPS band and eliminates interference. The output signal of the GPS filter 26 is then passed into the low noise amplifier 28, which amplifies the signal while adding virtually no additional noise. The mixer 31 shifts frequency of the GPS signal by the frequency of the local oscillator 30, resulting in an output signal at approximately 660 MHz. The transmission band filter 32 selects the output band and limits the noise bandwidth.

An output amplifier 34 amplifies the signal produced by the transmission band filter 32 to a level sufficient to overcome path losses between the remote module 20 and the interrogation unit 14. The GPS interface portion 20 of the remote module 10 uses considerably less expensive components than the GPS receiver 19 which it replaces. In place of a relatively expensive prior art receiver located adjacent each lost article, the present invention functions equally well utilizing a mixer, a couple of oscillators, and a couple of filters. In view of the fact that one remote module 10 can be associated with each article 12 which may become lost, the present invention provides considerable cost savings with equivalent performance.

The purpose of the power management portion 22 is to control the power consumption of the GPS interface portion 20, which uses large amounts of power (in the range of 0.1 to 10 watts) when operational. The above control is effected simply by controlling the electrical connection between the power supply device 46 and the GPS interface portion 20, as follows.

A coded signal is transmitted from the interrogation unit 14 of FIG. 1, in a manner described later in the specification. The coded signal is received by the code receive antenna 40, which supplies the received coded signal to the code receiver 42 which includes a positional request by the remote module 10. The code receiver 42 interprets this signal, and thereupon determines the operation of the power supply management device 44 by a series of coded transmissions. The power management device 44 controls the application of power both to the code receiver 42 via the power management portion switch 48; and to the GPS interface portion 20 via the GPS interface portion switch 50 in a manner as is well known in the controller art.

There are two techniques by which the code receiver can operate. The first technique involves continual operation, in which the code receiver is continually listening for signals from the interrogation unit 14, which relate to that specific remote module 10 (in effect, switch 48 is always closed). The second, more energy efficient, technique involves the code receiver cycling on and off, with the period of the duty cycle being selected such that the code receiver will still recognize all signals which potentially are being transmitted from the interrogation unit 14. Upon receipt of such a potentially relevant signal, the code receiver 42 then instructs the power management device 44 to close the power management portion switch 48 for a sufficient period so that the code receiver will be able to receive and interpret any such code signals. It is also possible that this system may be configured such that the power management portion switch 48 remains open until a second similar, deactivating signal is received.

The "on" part of the duty cycle may be fixed, yet be long enough to permit a complete serial number to be decoded. In fact, the "on" portion of the duty cycle would be twice as long as the code transmission. In this manner, interception of a transmission shortly after the beginning of one complete code would ensure that the next cycle would be intercepted completely. Using the on-off cycling technique, the code transmission must be repeated multiple times before the receiver is able to decode a complete transmission. If the code signal is valid, and instructs the remote module 10 to begin operation (translate GPS signals to determine the location of the remote module 10 via the GPS), then the code receiver 42 will instruct the power management device 44 to close the normally open GPS interface portion switch 50. When the GPS interface portion switch is closed, then the GPS interface portion 20 will commence operation in the manner described above, permitting the interrogation unit 14 to compute the relative position of the remote module 10 using the techniques described above.

Figure 3:
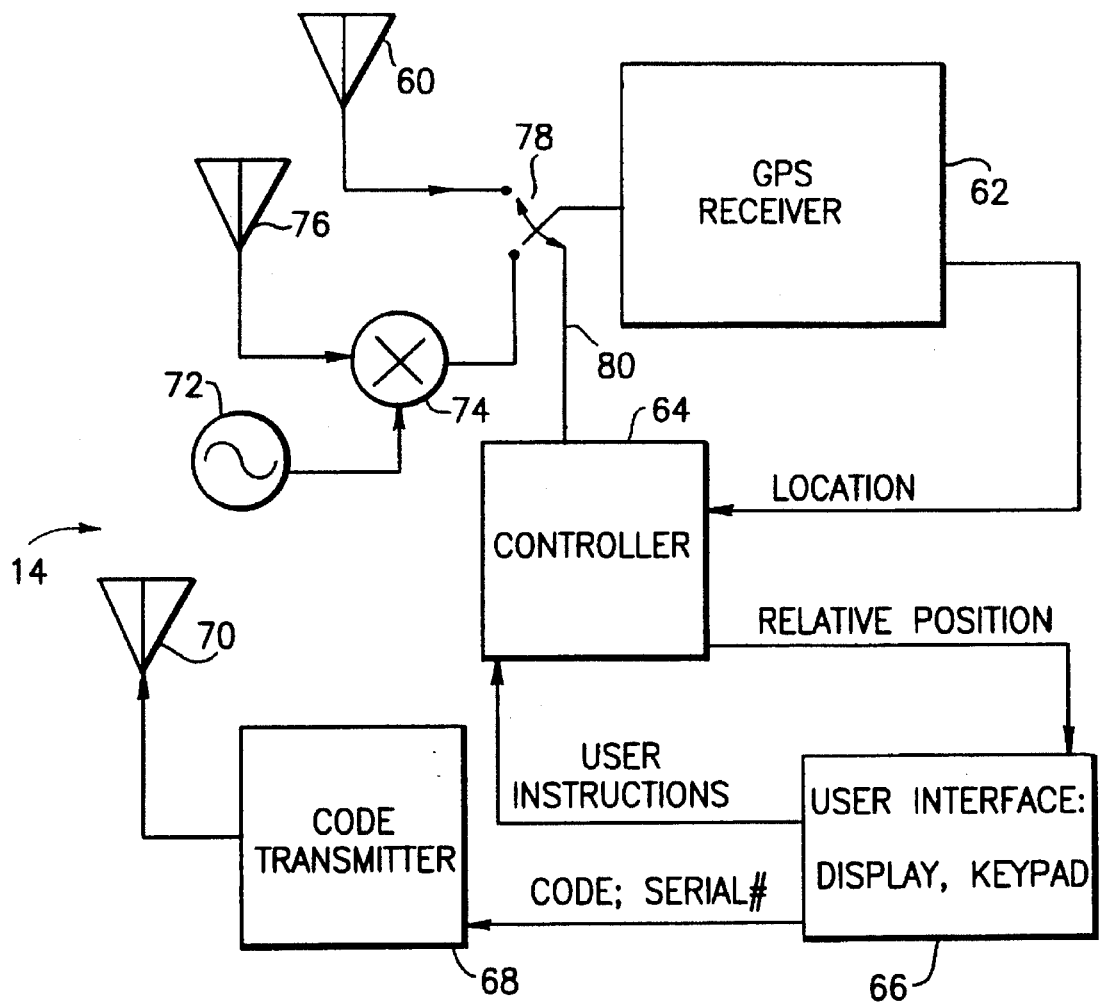
FIG. 3 illustrates a schematic view to one embodiment of a interrogation unit (14) of the present invention.
Figure 4:
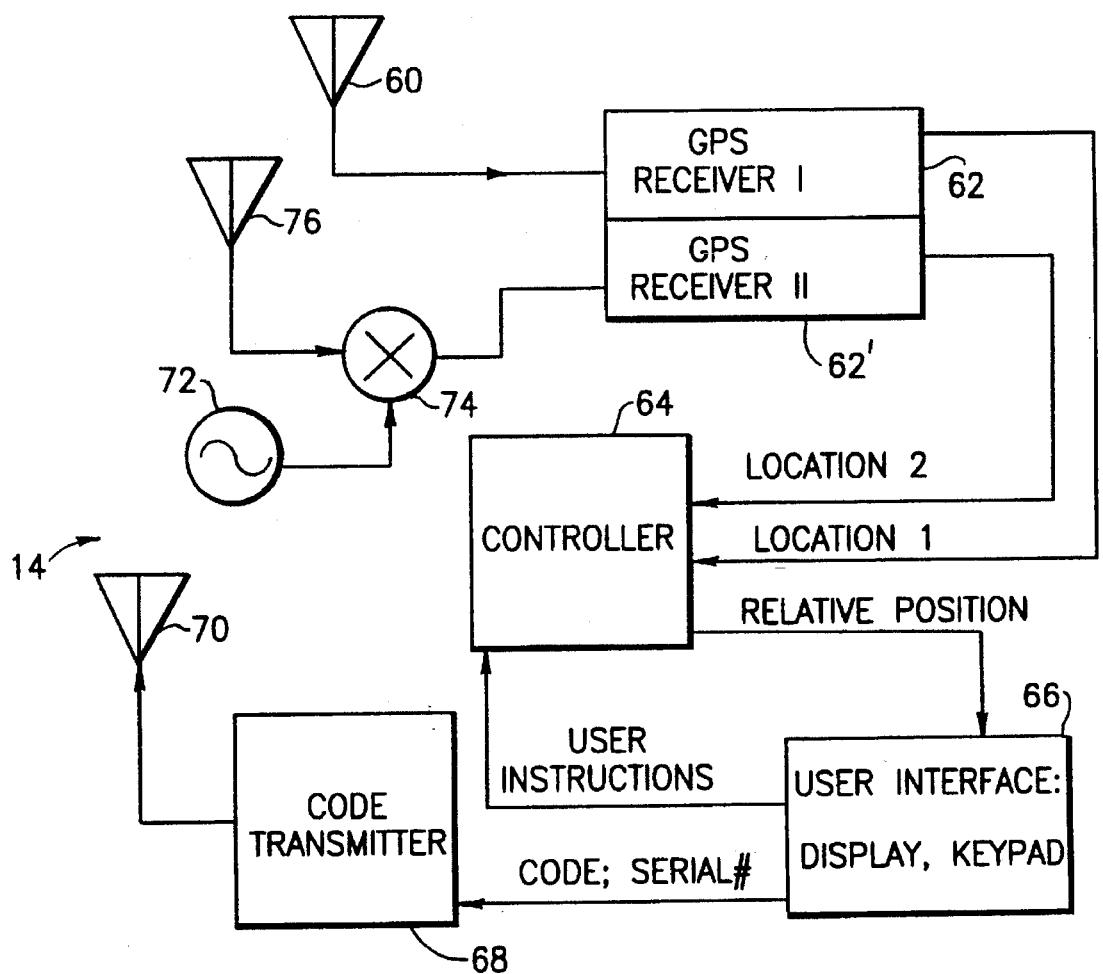
FIG. 4 illustrates a similar view of FIG. 3 of an alternate embodiment of interrogation unit (14) of the present invention.
Figure 5:
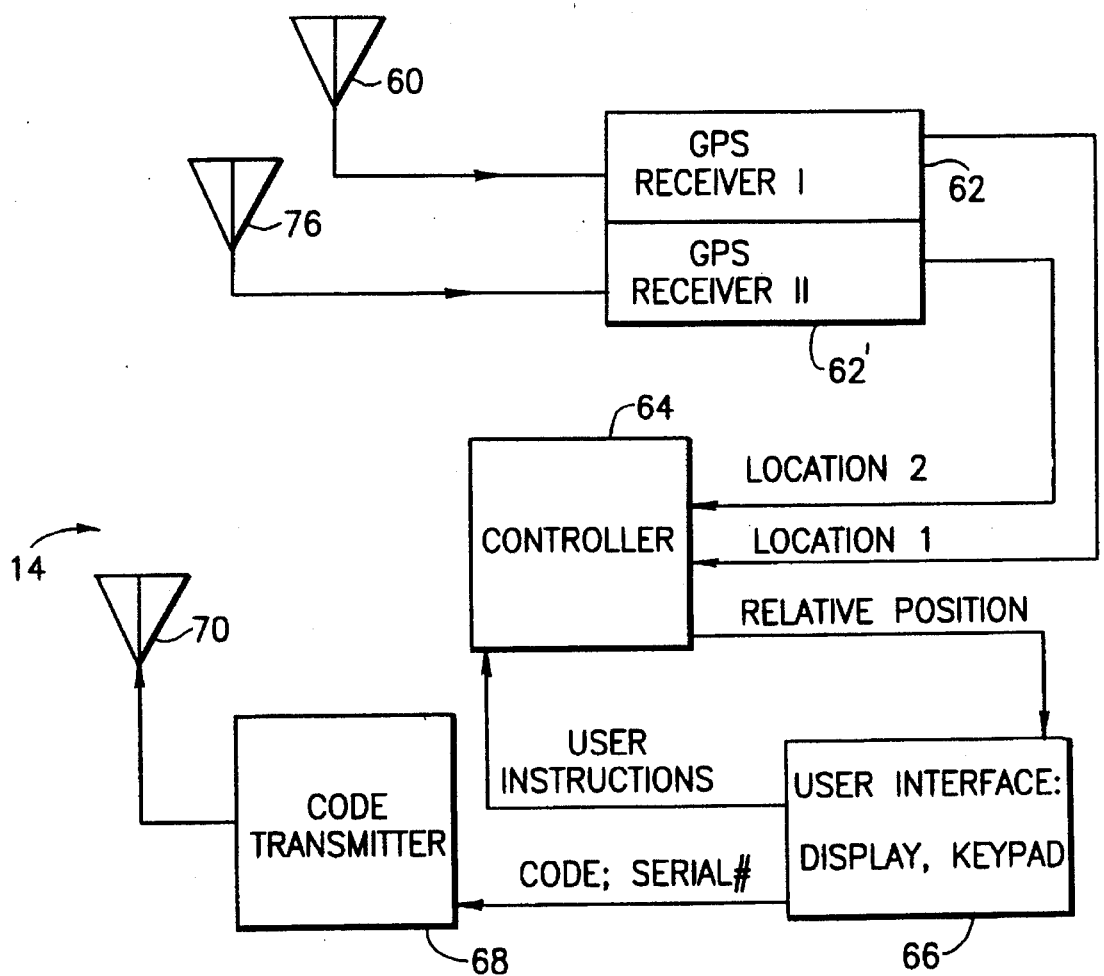
FIG. 5 illustrates a similar view to FIG. 3 of yet another alternate embodiment of interrogation unit (14) of the present invention.

Different embodiments of the interrogation unit are illustrated in FIGS. 3, 4 and 5. The FIG. 3 embodiment includes a GPS antenna 60, a GPS receiver 62, a controller 64, a user interface 66, a code transmitter 68, a code band antenna 70, a local oscillator 72, a mixer 74, a retransmitted GPS band antenna 76, and an interrogation unit switch 78.

The GPS antenna 60 receives a direct GPS signal from transmitters located aboard at least four of the GPS satellites. The retransmitted GPS band antenna 76 receives a translated composite raw GPS signal from the remote module 10 (which can be decoded to provide positional information of remote module 10). The interrogation unit switch 78 will switch the GPS receiver input between the GPS antenna 60 and the retransmitted GPS band antenna 76). The signal applied to the GPS receiver 62 may be applied by either the GPS antenna or the retransmitted GPS band antenna 76. The controller 64 controls the operation of the switch 76 described above. The user interface 66, which typically includes a display and a keyboard (not illustrated), regulates the operation of the controller 64 by selecting which remote module 10 to locate, and utilizes the coded keyword for each lost article.

The user interface is also in communication with the code transmitter 68 which formats and transmits a signal (via the code band antenna 70), as has been selected by the user interface. The code band antenna 70 is configured to be capable of being in direct electronic communication with the code receive antenna 40 of FIG. 2. The user of the system inputs data into the user interface 66 which includes such specifics as the code or serial number of the remote module 10 of FIG. 2. That input code will then be sent to the code transmitter, and the coded signal will be transmitted over the code band antenna 70 to the code receive antenna 40 of FIG. 2, at which point the signal will be treated as described previously. It is also possible that this function will be performed continuously to monitor the location of all of the potentially lost articles in the region.

The interrogation unit 14 may be either a hand held unit, fixed within a tower, contained in a vehicle, or located in any other position suitable for the specific application. This invention has particular application in trucking of goods. The mobile unit may be combined with a vehicle navigation and communication system (known in the art), which could result in several features:

1. In-cab display of the location of a particular shipment intended as the next load.
2. Direct transfer of the next load serial number or identification number, followed by an in-cab display of that load.
3. Several hardware elements could be combined. The same GPS receiver 62 used for vehicle navigation could be used to indicate the position of the next load.

The mixer 74 acts to combine a carrier signal produced by the local oscillator 72 and the signal produced by the retransmitted GPS band antenna 76 in a similar manner to that produced by the low noise amplifier 28 and the local oscillator 30 of FIG. 2, as described previously.

In order to describe the interrelationship between the interrogation unit 14 and the remote module 10, it is necessary to consider one property of GPS known as selective availability. In view of the accuracy of GPS systems, governmental agencies have adopted selective availability in their GPS systems, in order to make the signals from any one GPS satellite vary with time. For example, the GPS information can vary as much as several hundred feet in a 30 second period. Selective availability has been adopted primarily so that terrorists cannot use GPS as a bombing aide. Therefore, it is difficult for any GPS receiver (or translator) to determine its position accurately without outside additional information. Such outside information may include a second GPS receiver which is positioned at a known location that is also relatively close to the first receiver (or translator). Both receivers will be receiving the same signals from the GPS satellites, and both receivers will be experiencing approximately the same errors. Therefore, if the GPS receiver, which is at the non-fixed position, is able to determine it's position relative to the GPS satellite, it can also determine the error induced in the fixed receiver (by comparing the known position of the fixed receiver compared to the indicated position of the fixed receiver). The non-fixed receiver will then be able to correct its own position by applying the same error, and the non-fixed receiver (or translator) will be able to obtain accurate positional information. This process is known as relative GPS, the fundamentals of which is known in the art.

There are three potential embodiments of the interrogation unit to be associated within the above translator scheme. The first embodiment is illustrated in FIG. 3 in which the interrogation unit switch 78 may be switched such that the GPS receiver either receiving a signal, via GPS antenna 60, directly from a GPS satellite; or the GPS receiver 62 is receiving a signal, via the retransmitted GPS band antenna 76, from the remote unit 20 (translator). The second implementation, as illustrated in FIG. 4, is identical to the FIG. 3 embodiment except that there are two GPS receivers 62 and 62' (there is no need to provide the interrogation unit switch 78 of FIG. 3). The controller 64 receives a constant input of positional information from both GPS receivers 62, 62', and is able to compute the position of the remote unit in much the same manner as described with respect to the FIG. 3 embodiment using relative GPS.

In both of these embodiments, the GPS receiver receives GPS data of two frequencies. The first frequency the direct frequency (as transmitted by the GPS transmitter on the satellite), and the second frequency is the translated frequency (the frequency modification is caused by the remote unit 10). The third embodiment of the present invention, as illustrated in FIG. 5, is identical to the FIG. 4 embodiment except that the local oscillator 72 and the mixer 74 are removed. In the FIG. 5 embodiment, the GPS receivers 62 and 62' receives two signals are at different frequencies.

The above provide the preferred embodiments of the present invention. It should be noted that minor modifications to the invention, such as would be obvious to those of ordinary skill in the art, are also within the intended scope of the present invention.

What is claimed is:

1. In a global positioning system (GPS) including satellites orbiting the earth and transmitting positional information signals, a system for locating a lost article comprising:

a mobile encoder transmitter/receiver device for transmitting a coded identification signal specifically corresponding to an identification number associated with a particular lost article, a decoder transmitter/receiver device affixed to said particular lost article, said decoder transmitter/receiver device being activated in response to said coded identification signal from said mobile encoder transmitter/receiver device to receive positional information signals from said GPS and to re-transmit said positional information as alternate, frequency shifted GPS positional information signals, wherein said mobile encoder transmitter/receiver device receives said alternate, frequency shifted GPS positional information signals re-transmitted from said decoder transmitter/receiver device and said positional information signals from said GPS to determine the position of said particular lost article.

2. A system according to claim 1 wherein said decoder transmitter/receiver device affixed to said particular lost article includes a power management circuit wherein said decoder transmitter/receiver device is turned on for selected time periods to receive said positional information signals from said GPS.

3. A system according to claim 1 wherein said decoder transmitter/receiver device affixed to said particular lost article includes an interface circuit for receiving said positional information signals from said GPS, for translating said received GPS positional signals, and for re-transmitting said translated GPS positional signals, a code receiver circuit for receiving said coded identification signal transmitted from said mobile encoder transmitter/receiver device, and a power management circuit, including a power supply means, responsive to a signal from said code receiver circuit for selectively connecting said power supply means to said interface circuit to activate said interface circuit to receive said positional information signals from said GPS and to activate said code receiver circuit to receive said coded identification signal transmitted from said mobile encoder transmitter/receiver device.

4. A system according to claim 3 wherein said interface circuit includes a GPS receive antenna for receiving said positional information signals from said GPS, a mixer circuit connected to said GPS receive antenna, a local oscillator connected to said mixer circuit for shifting the frequency of said received GPS positional information signals to provide translated GPS positional signals, and a GPS re-transmit antenna connected to said mixer to transmit said translated GPS positional signals to said mobile encoder transmitter receiver device.

5. A system according to claim 4 wherein, said power management circuit activates said interface circuit only during those periods that said interface circuit is being utilized.

6. A system according to claim 5 further including:

analysis timer means for maintaining power to said power management circuit for a predetermined period after the coded identification signal directed to said interface circuit has been detected.

7. A system according to claim 1 wherein said mobile encoder transmitter/receiver device includes a GPS receiver circuit for selectively receiving said positional information signals from said GPS, and said re-transmitted positional signals from said decoder transmitter/receiver device.

8. A system according to claim 7 wherein said mobile encoder transmitter/receiver device further includes means for generating said coded identification signal corresponding to an identification number associated with a particular list article, and a code transmitter connected to said coded identification signal generating means for transmitting said coded identification signal to said decoder transmitter/receiver device.

9. A system according to claim 7 wherein said GPS receiver circuit includes a first receiver circuit for receiving said positional information signals from said GPS and a second receiver circuit for receiving said re-transmitted GPS translated positional signals from said decoder transmitter/receiver device.

10. A system according to claim 7 wherein said mobile encoder transmitter/receiver device further includes a mixer circuit connected to said GPS receiver circuit, and responsive to said re-transmitted, translated GPS positional information signals, and a local oscillator circuit connected to said mixer circuit for re-translating said re-transmitted translated GPS positional information signals.

11. A system according to claim 4 wherein said mobile encoder transmitter/receiver device includes a GPS receiver circuit for selectively receiving positional information signals from said GPS, and re-transmitted translated GPS positional signals from said decoder transmitter/receiver device.

12. A system according to claim 11 wherein said mobile encoder transmitter/receiver device further includes means for generating said coded identification signal corresponding to an identification number associated with a particular lost article, and a code transmitter connected to said coded identification signal generating means for transmitting said coded identification signal to said decoder transmitter/receiver device.

13. A system according to claim 11 wherein said GPS receiver circuit includes a first receiver circuit for receiving said positional information signals from said GPS and a second receiver circuit for receiving said re-transmitted GPS translated positional signals from said decoder transmitter/receiver device.

14. A system according to claim 11 wherein said mobile encoder transmitter/receiver device further includes a mixer circuit connected to said GPS receiver circuit, and responsive to said re-transmitted, translated GPS positional information signals, and a local oscillator circuit connected to said mixer circuit for re-translating said re-transmitted translated GPS positional information signals.

15. A method for locating a lost article, comprising the steps of:

transmitting a coded signal from a local encoder transmitter, to a decoder receiver, said coded signal representing an identification number designating said decoder receiver to actuate said decoder receiver, said decoder receiver being located in the proximity of said lost article;

translating a GPS positional information signal into a modified frequency; and determining a location of said decoder receiver by comparing said modified signal in said decoder receiver to a direct GPS signal.

16. The method as described in claim 15, further comprising the step of:

actuating the decoder receiver only at times when said coded signal is received, and for a predetermined period thereafter.

17. The method as described in claim 15, further comprising the step of:

monitoring said coded signal, by a power management circuit in said which is said decoder receiver.

18. The method as described in claim 15, wherein said monitoring step consists of turning said power management circuit on and off at such a rate that it can determine whether a coded signal, which may be being transmitted to said decoder receiver, is indeed being transmitted to said decoder receiver.

19. The method as described in claim 15, further comprising the step of:

actuating the decoder receiver only at times when said coded signal is received, and deactivating said decoder receiver upon the receipt of another coded signal.

20. A method using a global positioning system (GPS) including satellites orbiting the earth and transmitting positional information signals, a system for locating a lost article comprising the steps of:

Step 1. transmitting from a mobile encoder transmitter/receiver devices a coded identification signal specifically corresponding to an identification number associated with a particular lost article, Step 2. receiving said coded identification signal in a decoder transmitter/receiver device affixed to said particular lost article, Step 3. activating said decoder transmitter/receiver device in response to said coded identification signal from said modible encoder transmitter/receiver device, Step 4. receiving positional information signals from said GPS, Step 5. re-transmitting said positional information as alternate, frequency shifted GPS positional information signals, Step 6. determining the position of said particular lost article by receiving said alternate, frequency shifted GPS positional information signals re-transmitted from said decoder transmitter/receiver device and said positional information signals from said GPS.

* * * * *